(12) United States Patent
Braiman (10) Patent No.: US 9,619,988 B2
(45) Date of Patent: Apr. 11, 2017

(54) METHOD OF CONTROLLING LOCATION MONITORING AND REPORTING

(71) Applicant: PRECYSE TECHNOLOGIES, INC., Atlanta, GA (US)

(72) Inventor: Michael Braiman, Alpharetta, GA (US)

(73) Assignee: PRECYSE TECHNOLOGIES FUNDING, LLC, Norcross, GA (US)

( * ) Notice: Subject to any disclaimer, the term of this patent is extended or adjusted under 35 U.S.C. 154(b) by 0 days.

(21) Appl. No.: 14/765,034

(22) PCT Filed: Jan. 28, 2014

(86) PCT No.: PCT/US2014/013312
§ 371 (c)(1),
(2) Date: Jul. 31, 2015

(87) PCT Pub. No.: WO2014/120649
PCT Pub. Date: Aug. 7, 2014

(65) Prior Publication Data
US 2015/0371521 A1    Dec. 24, 2015

Related U.S. Application Data

(60) Provisional application No. 61/759,079, filed on Jan. 31, 2013.

(51) Int. Cl.
*H04Q 5/22* (2006.01)
*G08B 21/04* (2006.01)
*G06K 7/10* (2006.01)

(52) U.S. Cl.
CPC ..... *G08B 21/0446* (2013.01); *G06K 7/10415* (2013.01)

(58) Field of Classification Search
None
See application file for complete search history.

(56) References Cited

U.S. PATENT DOCUMENTS

2002/0126009 A1    9/2002  Oyagi et al.
2006/0003775 A1    1/2006  Bull et al.
(Continued)

FOREIGN PATENT DOCUMENTS

JP    2008544608 A       12/2008
WO    2006065430 A1       6/2006
WO    WO 2006065430 A1 *  6/2006  ............. A61H 3/061

OTHER PUBLICATIONS

Korean International Searching Authority-KIPO, PCT International Search Report and Written Opinion regarding corresponding PCT Application No. PCT/US2014/013312 issued May 13, 2014, pp. 1-12.

(Continued)

*Primary Examiner* — Adolf Dsouza
(74) *Attorney, Agent, or Firm* — Duane Morris LLP; Steven E. Koffs (57) ABSTRACT

A method comprises: receiving a signal from a first device that is part of a tag, the tag adapted to be affixed to a person or object, the receiving being performed by a processor within the tag; analyzing the signal within the processor to determine whether the person or object is performing a predetermined type of behavior; adjusting a variable rate of transmitting a monitoring signal from the tag, based on a result of the analyzing, the adjusting being controlled by the processor; and transmitting the monitoring signal from the tag to an external device separate from the tag at the adjusted variable rate.

16 Claims, 10 Drawing Sheets

(56) References Cited

U.S. PATENT DOCUMENTS

| | | |
|---|---|---|
| 2008/0168826 A1 | 7/2008 | Saidi et al. |
| 2008/0186166 A1 | 8/2008 | Zhou et al. |
| 2008/0315999 A1 | 12/2008 | Braiman |
| 2009/0280705 A1 | 11/2009 | Puls et al. |
| 2010/0102964 A1 | 4/2010 | Steer |
| 2011/0316674 A1 | 12/2011 | Joy et al. |
| 2012/0083705 A1* | 4/2012 | Yuen .................... A61B 5/0002 600/508 |

OTHER PUBLICATIONS

Intl. Search Report/Written Opinion issued Jun. 27, 2016 in counterpart PCT patent application No. PCT/US2016/024702.

* cited by examiner

| REF. INPUT | WALK | RUN | JUMP | 2X-STEP | FALL | DRIVE | PLANE | HC |
|---|---|---|---|---|---|---|---|---|
| WALK | HIGH | LOW | MEDIUM | MEDIUM | LOW | LOW | LOW | LOW |
| RUN | LOW | HIGH | MEDIUM | MEDIUM | LOW | LOW | LOW | LOW |
| JUMP | MEDIUM | MEDIUM | HIGH | MEDIUM | MEDIUM | LOW | LOW | LOW |
| 2X-STEP | MEDIUM | MEDIUM | MEDIUM | HIGH | LOW | LOW | LOW | LOW |
| FALL | LOW | LOW | LOW | LOW | HIGH | HIGH | LOW | LOW |
| DRIVE | LOW | LOW | LOW | LOW | LOW | MEDIUM | HIGH | LOW |
| PLANE | LOW | LOW | LOW | LOW | LOW | LOW | HIGH | MEDIUM |
| HC | LOW | LOW | LOW | LOW | LOW | LOW | MEDIUM | HIGH |

METHOD OF CONTROLLING LOCATION MONITORING AND REPORTING

CROSS-REFERENCE TO RELATED APPLICATIONS

The present application is a U.S. national stage application under 35 U.S.C. §371 of International Application No. PCT/US2014/013312, filed Jan. 28, 2014, and which claims priority to U.S. Provisional Patent Application No. 61/759,079 filed on Jan. 31, 2013 which is incorporated herein by reference in its entirety.

FIELD

This disclosure relates to monitoring systems.

BACKGROUND

To ensure safety and security in the workplace, it would be desirable to know the location of all employees whose activities may impact themselves, others or property. A variety of smart tag systems have been developed which enable tracking of personnel and assets.

When tags are to be used for monitoring the location of personnel in remote locations, one of the driving factors in smart tag system design is extended battery life. It would be desirable to enable prolonged use of a tag—up to 18 months without a battery change—particularly in remote and inaccessible locations, such as deserts, offshore oil rigs, and many others.

SUMMARY

In some embodiments, a method comprises: receiving a signal from a first device that is part of a tag, the tag adapted to be affixed to a person or any inanimate object, the receiving being performed by a processor within the tag; analyzing the signal within the processor to determine whether the person or object is performing a predetermined type of behavior; adjusting a variable rate of transmitting a monitoring signal from the tag, based on a result of the analyzing, the adjusting being controlled by the processor; and transmitting the monitoring signal from the tag to an external device separate from the tag at the adjusted variable rate.

In some embodiments, a method comprises: receiving a signal from a first device within a tag adapted to be affixed to a person or object, the receiving being performed by a processor within the tag; analyzing the received signal over a period of time within the processor to determine whether a behavior of the person or object is changing substantially over the period of time; adjusting a variable rate of transmitting a monitoring signal from the tag, based on the analyzing, the adjusting being controlled by the processor; and transmitting the monitoring signal from the tag to an external device separate from the tag at the adjusted variable rate.

In some embodiments, a method comprises: receiving a signal from a first device within a tag adapted to be affixed to a person or object, the receiving being performed by a processor within the tag; analyzing the signal within the processor to determine whether a condition is present, the condition being from the group consisting of the person or object performing a first predetermined behavior and the person or object not performing a second predetermined behavior; monitoring a location of the tag if the condition is determined to be present; and transmitting a signal representing the location from the tag to an external device separate from the tag while the condition is present.

In some embodiments, a device comprises a housing adapted to be affixed to a person or object. A first sensor in the housing is capable of generating a signal indicative of a behavior of the person or object. A second sensor in the housing is capable of collecting location data. A processor in the housing is configured for receiving the first signal from the first sensor and analyzing the signal to determine whether a condition is present. The condition is from the group consisting of the person or object performing a first predetermined behavior and the person or object not performing a second predetermined behavior. The processor is capable of controlling the second sensor to collect location data according to a schedule selected by the processor based on a result of the analyzing. A transmitter is provided for transmitting a signal representing the location from the device to an external device separate from the device according to the schedule while the condition is present.

DETAILED DESCRIPTION

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

The inventor has provided a method of extending battery life in a smart tag by selecting a location monitoring schedule based on recognition that a person or object to which the smart tag is attached is performing (or not performing) a predetermined behavior or activity, also referred to as a reference behavior.

For example, the smart tag can monitor its location (and transmit the location to a an external receiver) at a low rate, such as one report every 15 minutes, while the tag senses that it is experiencing, "ordinary" motion or ordinary lack of motion. The inventor has further found that behavior analysis can be performed locally within the smart tag with less power than is used to monitor location and/or transmit location reports. In some embodiments, when the smart tag senses that the person or object is performing a behavior (e.g., motion) having characteristics the same as, or similar to, a predetermined (reference) behavior, the location monitoring and reporting rate is increased proportionally. When the smart tag senses that the behavior has returned to "normal," the location monitoring and reporting rate returns to the normal low rate.

As a result, the location monitoring rate can be automatically increased in proportion to how closely the detected behavior matches the predetermined behavior. Further, the increase in the location monitoring rate can be initiated as soon as the smart tag senses that an unusual behavior is being performed. The inventor has determined that undesirable events such as accidents and intentional misdeeds are more likely to occur when an employee is behaving outside of the his/her normal prescribed behavior. Thus, for example, an employee whose job normally involves sitting or walking is more likely to have an accident while running. By analyzing the employee's motion to determine whether the employee is running, the smart tag can automatically begin to monitor the employee's location when the employee runs. Should an accident occur, the system can pinpoint the employee's location, and also has a log of the employee's recent locations, from which the events leading up to the accident can be reconstructed.

In another example, an employee may work on an offshore oil drilling platform that is accessed by helicopter. The smart tag can monitor the employee's motion during normal activities, without collecting or transmitting location measurements. The smart tag can identify when the employee is likely to visit the platform by detecting a motion pattern associated with helicopter flight. Thus, when a motion pattern resembling helicopter motion is detected, the smart tag initiates (or increases the rate of) location monitoring and reporting. In some embodiments, when the helicopter motion stops (i.e., when the employee arrives on the platform), the smart tag returns to its regular low rate of reporting. In other embodiments, the monitoring continues for the duration of the employee's stay on the platform, and stops after the subsequent helicopter landing, away from the platform. That is, when a motion pattern associated with a trigger behavior is identified, the increased location monitoring and reporting continues after cessation of the trigger behavior, until after the motion pattern associated with a trigger behavior is again detected. This method of controlling the location monitoring and reporting can be used for any type of event or activity that is immediately preceded and immediately followed by a predetermined behavior.

Figure 1:
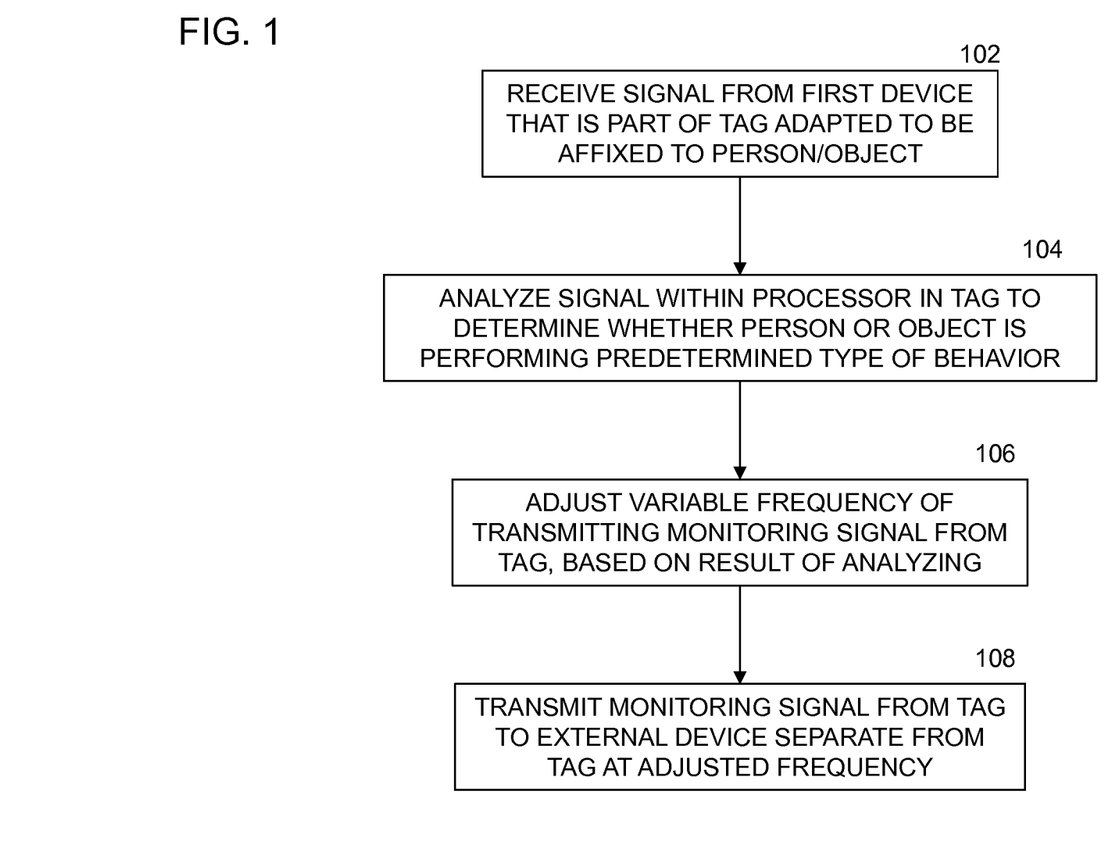
FIG. 1 is a flow chart of a method.

Referring to FIG. 1, an example of a method is shown.

At step 102, a processor within a smart tag receives a signal from a first device that is part of the tag. The tag is adapted to be affixed to a person or object. In some embodiments, the first device is an accelerometer.

At step 104, the processor analyzes the signal to determine whether the person or object is performing a predetermined type of behavior. In some embodiments, the processor compares the signal representing a detected motion to a signal representing a single predetermined behavior. In some embodiments, the processor compares the signal representing the detected motion to a plurality of signals representing respective a plurality of predetermined behaviors.

At step 106, the processor adjusts a variable rate of transmitting a monitoring signal from the tag, based on a result of the analyzing. The adjusting is controlled by the processor. In some embodiments, upon detection of the predetermined behavior, the location monitoring rate is increased to a fixed rate higher than the normal monitoring rate. In other embodiments, the monitoring rate can be varied continuously, based on the degree of similarity between the detected behavior and the target behavior.

At step 108, the tag transmits the monitoring signal to an external device separate from the tag at the adjusted variable rate.

Figure 2:
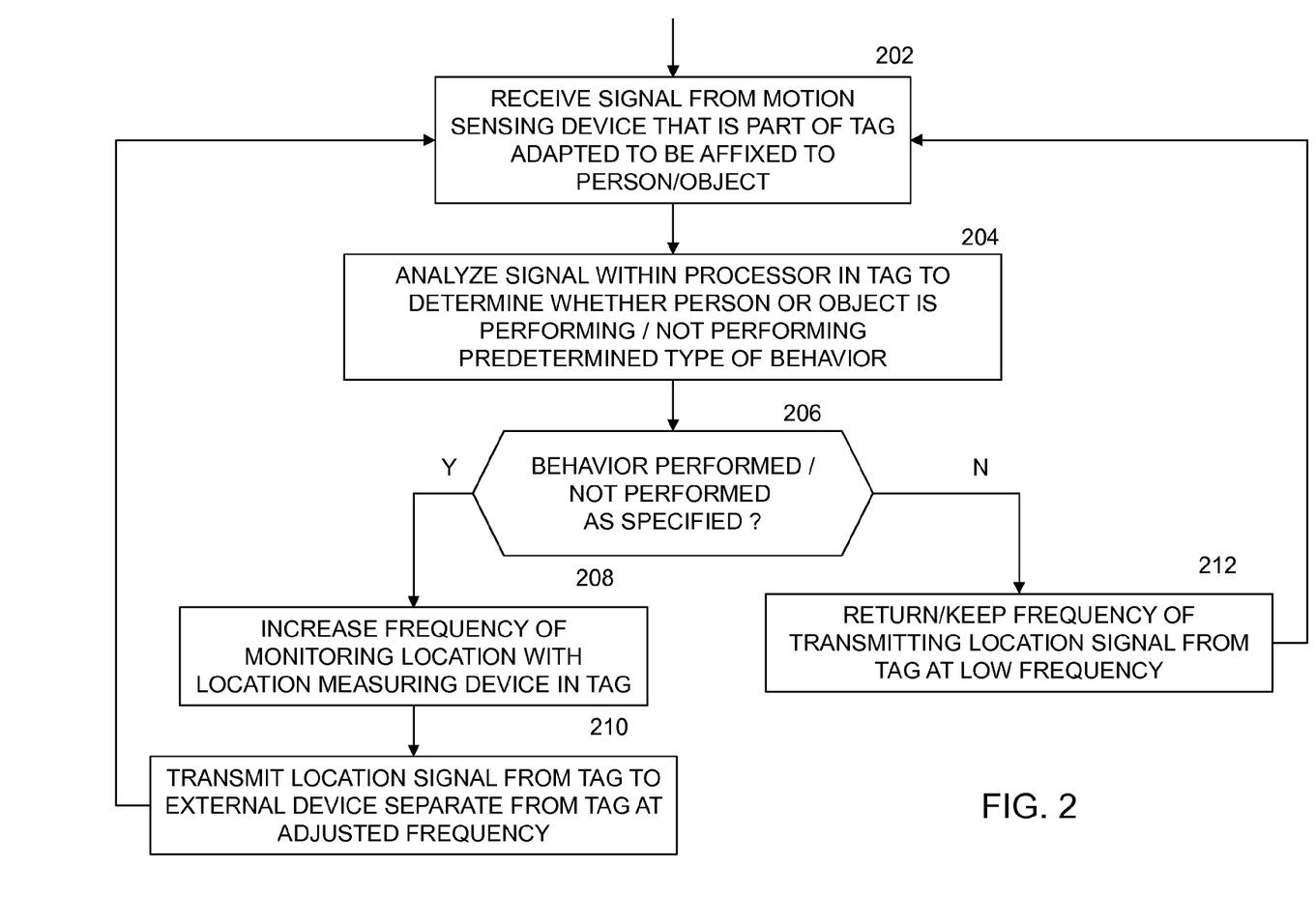
FIG. 2 is a flow chart of an embodiment of the method of FIG. 1.

This methodology can be used in a variety of contexts and applications. For example, FIG. 2 shows an example of the method of FIG. 1, according to some embodiments.

At step 202, a processor within a smart tag receives a signal from a first device within the tag. The tag is adapted to be affixed to a person or object.

At step 204, the processor analyzes the signal to determine whether a condition is present. In some embodiments, the condition is the person or object performing a first predetermined motion. In other embodiments, the condition corresponds to the person or object not performing a second predetermined motion.

At step 206, a determination is made whether the predetermined condition is present. If the condition is present, steps 208 and 210 are performed. If the condition is not present, step 212 is performed.

At step 208, a location of the tag is monitored with increased frequency by a location monitoring device within the smart tag, if the condition is determined to be present.

At step 210, a signal representing the location is transmitted from the tag to an external device separate from the tag while the condition is present. At the completion of step 210, the loop beginning at step 202 is repeated.

At step 212, if the predetermined (motion) condition is not present, and the location monitoring rate is set at a high rate, the location monitoring rate is returned to its normal low rate. If the predetermined (motion) condition is not present, and the location monitoring rate is set at its normal low rate, the location monitoring rate remains at its normal low rate.

In various embodiments, a variety of methods are used to determine the location monitoring rate. In one embodiment, a single predetermined behavior is identified. The location monitoring rate is normally low. While the behavior is detected, the location monitoring rate is set at a predetermined high. When the predetermined behavior is discontinued, the monitoring rate returns to the normal low rate.

Figure 4:
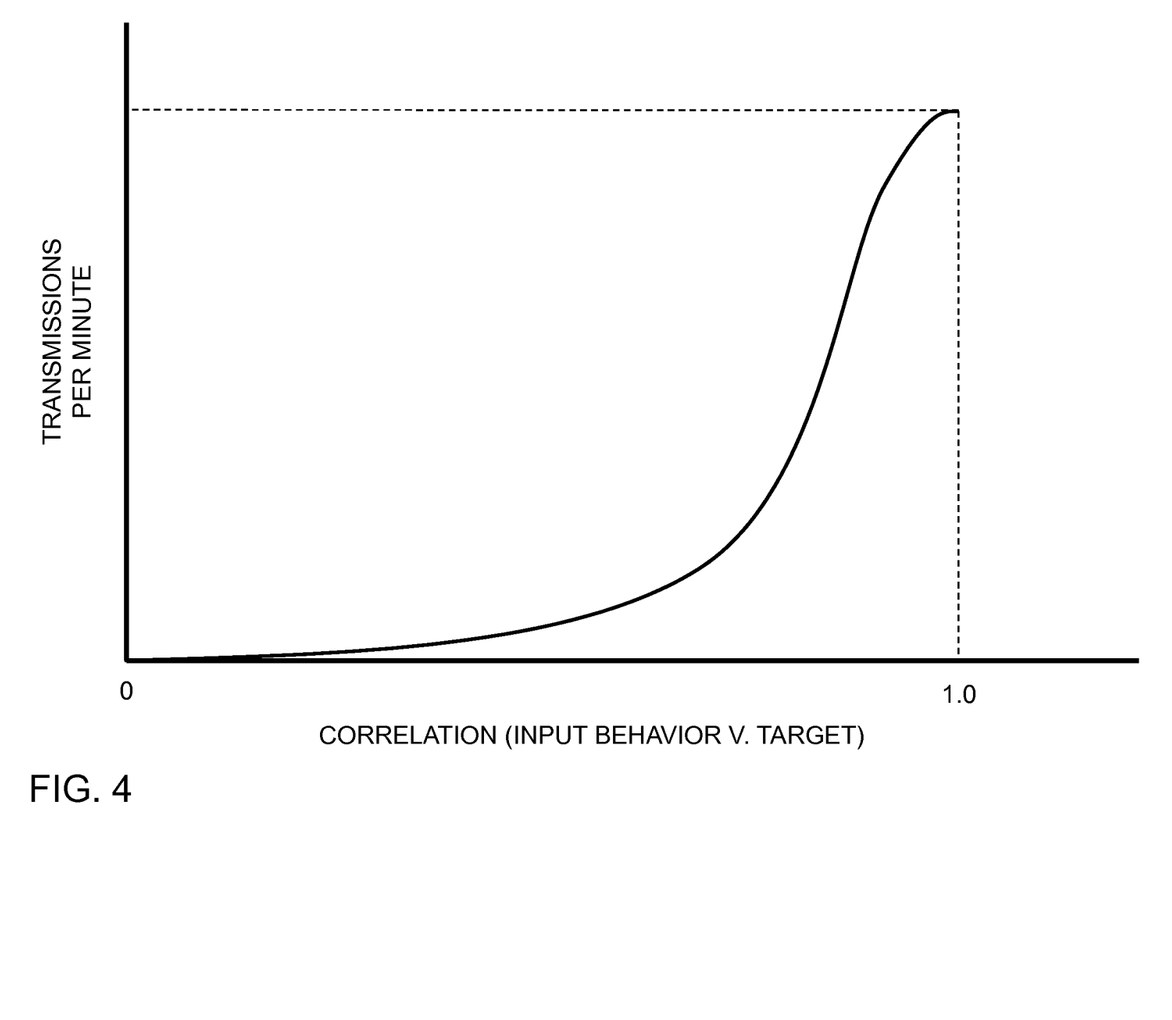
FIG. 4 is a diagram of a continuous function for determining location monitoring rate in a method according to FIG. 1 or FIG. 2.

In other embodiments, the processor computes a measure of how closely the current motion behavior resembles the predetermined behavior. The closer the current behavior is to the predetermined behavior, the higher the location monitoring frequency. In some embodiments, the analyzing includes computing a measure of how closely the received signal resembles a signal corresponding to the person or object performing the predetermined motion and determining the variable rate as a monotonically increasing function of the computed measure. For example, FIG. 4 shows an example of a location monitoring and transmission rate as a function of the correlation between the measured input motion behavior and the predetermined motion behavior. The higher the correlation, the higher the monitoring frequency. The monitoring frequency can be adjusted one time or many times while the behavior is being performed.

In other embodiments (not shown), the control device includes a fuzzy logic module that determines the degree to which a given input signal from the motion sensor conforms to any one or more predetermined behavior patterns. The fuzzy logic module selects a monitoring frequency by combining the results from each of the comparisons made. For example, the control device may contain fuzzy logic membership functions entitled, walking slowly, walking normally and walking quickly, which have overlapping velocity ranges and/or overlapping ranges of steps-per-minute. The controller can decrease, maintain, or increase the rate of location measurement and reporting based on the respective truth value indicating the likelihood that the output of the motion sensor corresponds to each of these three behaviors.

In other embodiments, the system is programmed to adopt location monitoring rates for one or more discrete predetermined activities or behaviors. An input behavior can be identified. Depending on which predetermined behavior(s) are selected to initiate monitoring, any given input behavior may initiate a different predetermined level of monitoring.

The first device (e.g., a motion sensor such as an accelerometer) is capable of transmitting respectively different signal patterns corresponding to respectively different types of motion. When the processor receives the signal pattern output by the first device (motion sensor), the processor compares the signal to one or more templates corresponding to predetermined behaviors. The processor is programmed to recognize at least one predetermined signal pattern as representing a performance of the predetermined type of motion by the person or object.

In some embodiments, the adjusting includes increasing the variable rate when the at least one predetermined signal pattern is recognized. In other embodiments, the adjusting includes increasing the variable rate when the signal is not recognized as corresponding to the at least one predetermined signal pattern. Thus the predetermined condition can be performance of a prohibited behavior or failure to perform a required behavior.

Figure 3:
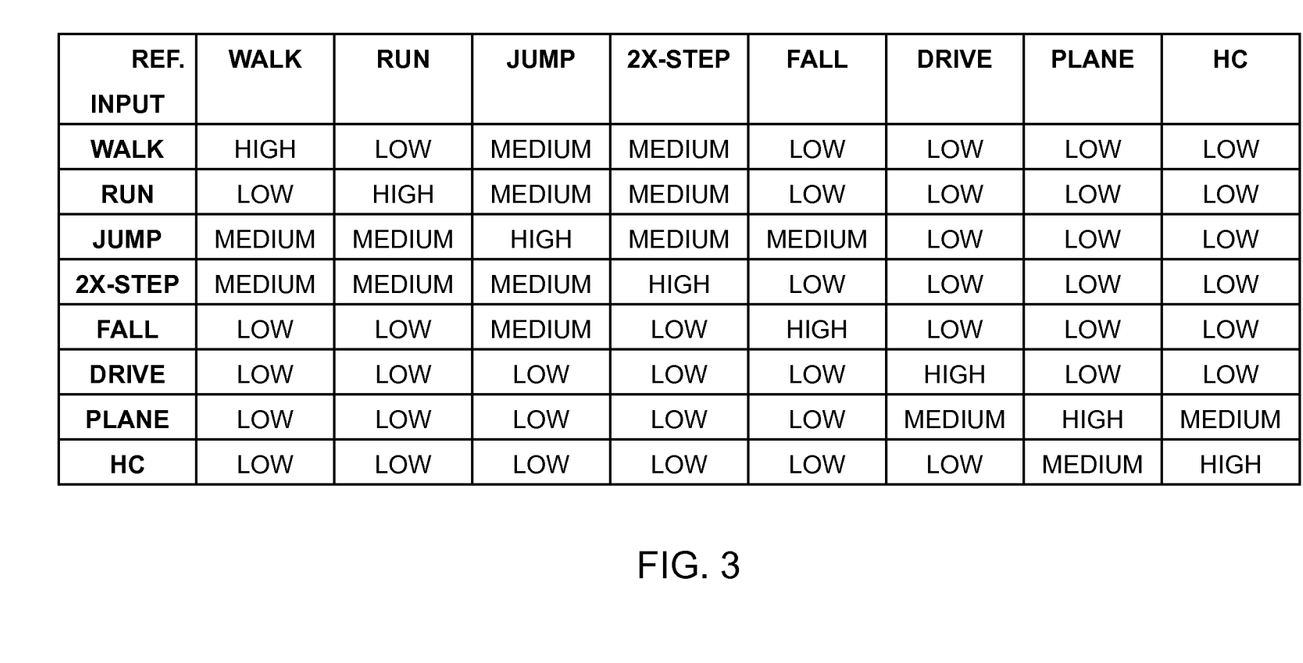
FIG. 3 is a diagram of a table for determining location monitoring rate in a method according to FIG. 1 or FIG. 2.

FIG. 3 is an example of a table stored in a non-transitory storage medium in the tag, defining the location monitoring frequency to be used, based on the predetermined reference activity or event (top row) and the input behavior sensed by the motion sensing device. A plurality of predetermined behaviors and their signature signals are identified to the system. These predetermined behaviors can include walking, running, jumping, descending (or ascending) stairs two steps at a time, falling, driving, flying in a plane, or flying in a helicopter. The similarity of each predetermined behavior to each other predetermined behavior can be determined (either manually by a user, or automatically by computing the correlation of the motion sensor outputs associated with each predetermined behavior. These similarity values are associated with location monitoring and reporting rates. for example, if the predetermined behavior is running, and the input behavior is running, the exact predetermined behavior has been detected, and the table indicates that the location monitoring is to be set to a high rate. If the predetermined behavior is running, and the input behavior is jumping or descending two steps at a time, an input behavior similar to the predetermined behavior has been detected, and the table indicates that the location monitoring is to be set to a medium rate. If the predetermined behavior is running, and the input behavior is falling, driving, or flying in a plane or helicopter, the detected behavior is not similar to the predetermined behavior, and the table indicates that the location monitoring is to be set to a low rate.

In some embodiments, the monitoring signal is the signal received from the first device. That is, the behavior is sensed by a device capable of generating an output signal indicating location, such as a high efficiency gyro. In other embodiments, the monitoring signal is a signal received from a second device, and transmitting signals from the second device uses more power than transmitting signals from the first device. For example, the person or object's behavior can be sensed with an accelerometer (which measures acceleration), and the location can be sensed with a second sensor, such as a gyro, GPS receiver, or RF transceiver (for communicating with a plurality of radio frequency (RF) beacons.

In some embodiment, the condition for each individual smart tag is selected before the tag is entered into service monitoring the person or object's behavior. In some embodiments, the system administrator can individually select the predetermined behavior for each employee's tag, based on a job position of the person. Thus, for an airplane pilot, the signal associated with plane flight is not an event that would cause increased monitoring of the employee's location, but the signal associated with helicopter flight can be such an event.

Figure 5:
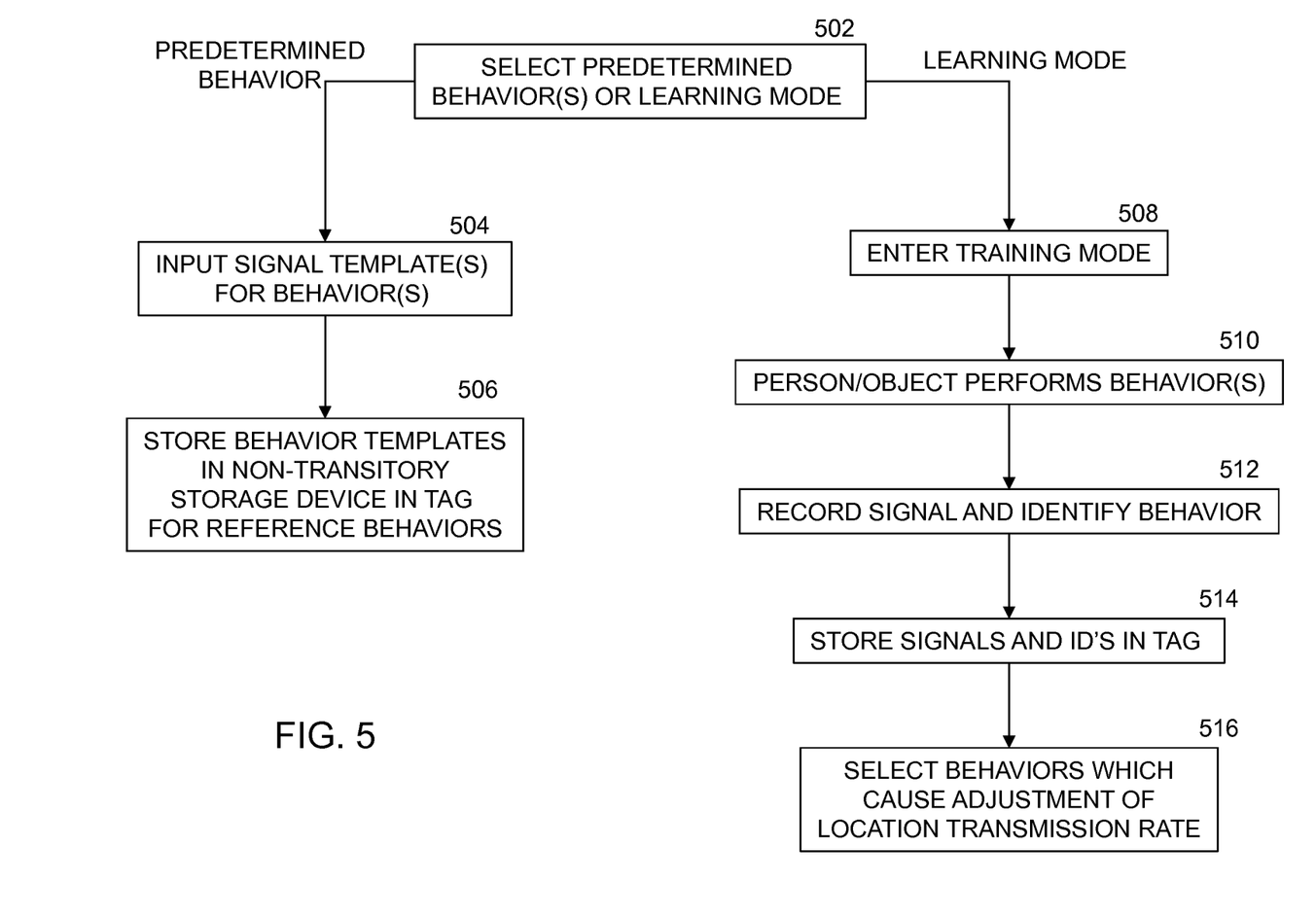
FIG. 5 is a flow chart of a method for defining a predetermined reference behavior to be used in a method according to FIG. 1 or FIG. 2.

FIG. 5 shows a method of configuring the controller in one of two modes.

At step 502, in some embodiments, the user is given the option of selecting one of two different operating modes: a predetermined behavior mode or a learning mode. This can be input by actuating a switch on the tag, for example.

At step 504, if the tag is operating in the predetermined behavior mode, the system administrator inputs one or more signal templates for the predetermined behavior(s). In some embodiments, the templates resemble the raw output signal of the motion sensor (e.g., accelerometer). This may reduce any transformation of the input signal needed to compare the input to the predetermined behavior signature signal. In other embodiments, the sensor output is to be transformed before comparison to the template.

At step 506, the behavior templates are stored in a non-transitory storage device in the tag for later use as predetermined behaviors, to which input behaviors are to be compared.

At step 508, the tag is placed in learning mode. In the learning mode, the tag records and analyzes the output signals from the sensor during a training period, and builds its own behavior templates.

At step 510, with the training mode initiated, the person is instructed to perform one or more predetermined behavior(s). Thus, the person may be instructed to walk, run, jump, climb steps, two at a time, fall, drive, or the like.

At step 512, the controller samples and records the sensor output signal while the person or object performs one or more predetermined motions. The behavior(s) is (are) identified. In some embodiments, the identification involves labeling the recorded profile as corresponding to the type of motion the person was instructed to perform.

At step 514, the controller stores a representation of the at least one predetermined motion pattern in a storage device within the tag. (Subsequently, when behavior is monitored, the analyzing includes comparing the sampled signal to the received signal.

At step 516, if multiple behaviors have been sampled and stored in the tag, the system administrator can select a subset of the stored behaviors to be used as reference behaviors during operation. Subsequently, during operation, the analyzing step includes comparing the sampled signal to the received signal.

Figure 6:
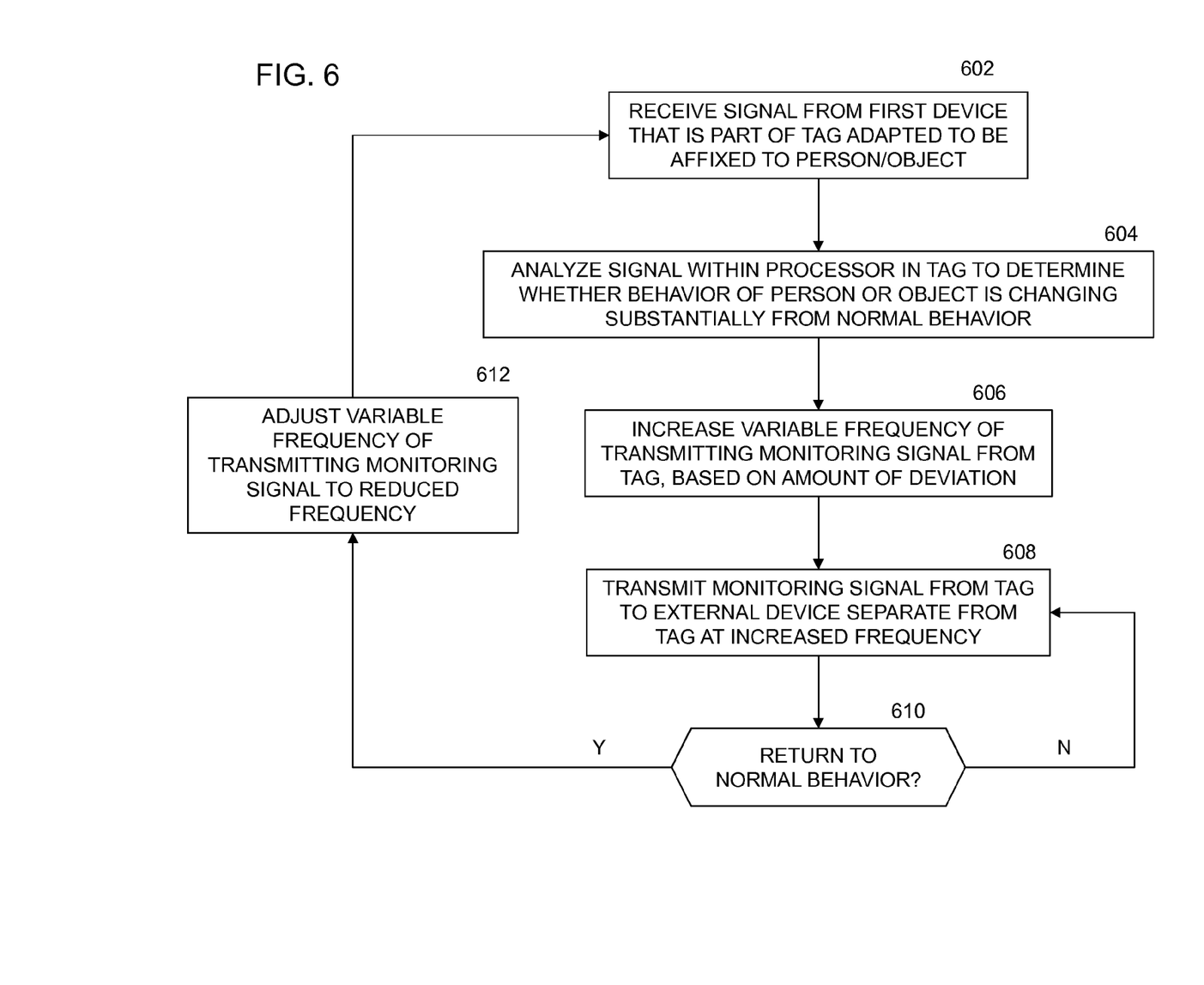
FIG. 6 is a flow chart of another embodiment of the method of FIG. 1.

FIG. 6 is a flow chart of another variation of the method.

At step 602, a processor in a smart tag receives a signal from a first device within the tag. The tag is adapted to be affixed to a person or object.

At step 604, the processor within or on the tag analyzes the received signal over a period of time to determine whether a motion behavior of the person or object is changing substantially over the period of time. For example, a Kalman filter can be used to determine the normal behavior based on the signals received from the motion sensor, and to determine whether the a posteriori state estimate deviates substantially from the a priori state estimate. In some embodiments, the processor runs a neural network algorithm to self-train the system, based on activity during a training period.

At step 606, the processor adjusts a variable rate of transmitting a monitoring signal from the tag, based on the analyzing. The variable rate is adjusted by an amount that increases monotonically as a function of a magnitude of the changing. Thus, the system can respond to any sudden change in behavior by increasing the rate of monitoring, without a priori knowledge of what the behavior will be.

At step 608, the tag transmits the monitoring signal from the tag to an external device separate from the tag at the adjusted variable rate.

At step 610, a determination is made whether the motion detected by the sensor in the tag has returned to the normal motion pattern. If the system has returned to the normal behavior, the step 612 is performed. If the system has not returned to the normal behavior, the step 610 is performed.

At step 612, the processor in the tag adjusts the variable rate of transmitting a monitoring signal from the tag, based on the analyzing to return to the lower normal rate.

Figure 7:
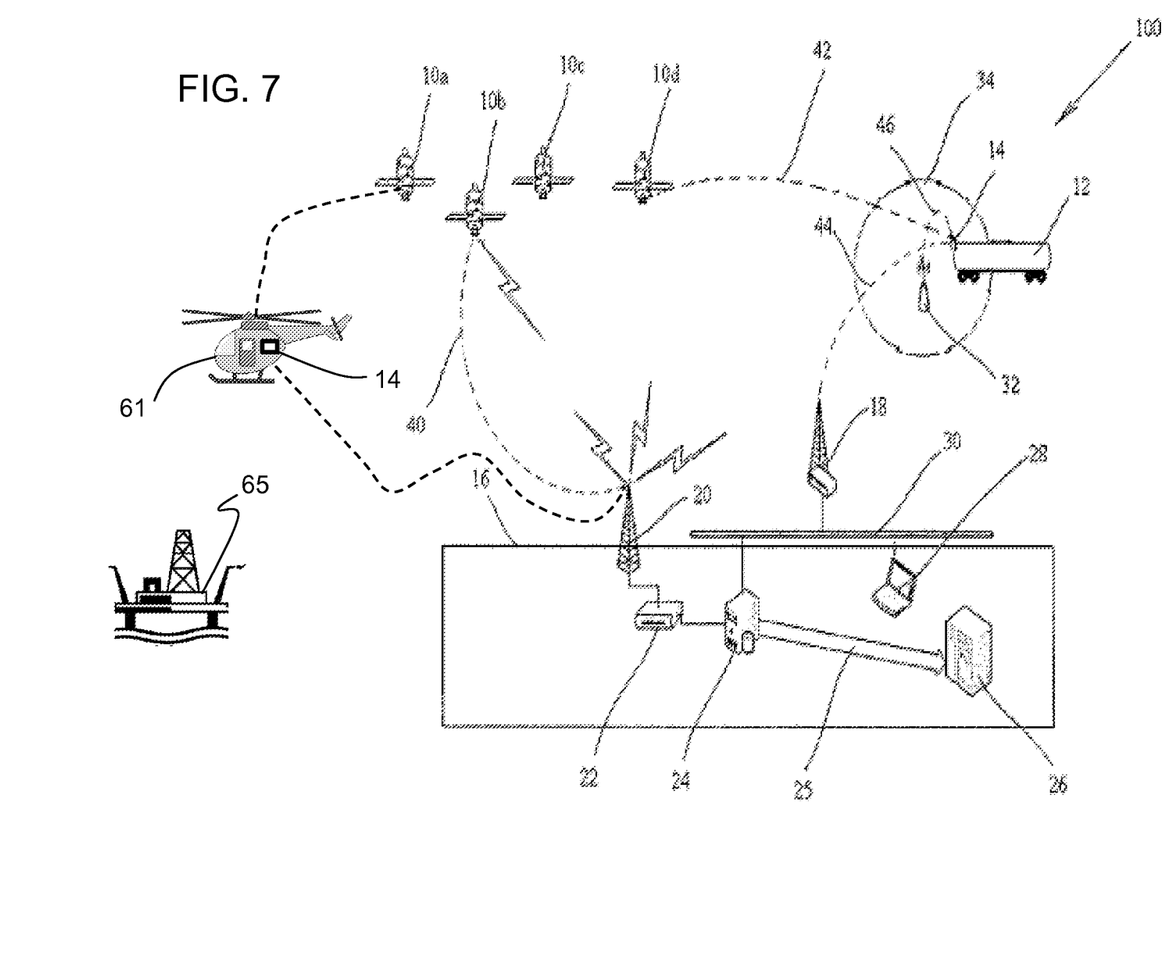
FIG. 7 is a schematic diagram of a system for performing the method of FIG. 1

Reference is now made to FIG. 7, schematically illustrating a block diagram of a smart tag system 100 according to an exemplary embodiment. FIG. 7 provides an example in which the smart tag 14 is used with an assisted GPS (AGPS) system. In other embodiments, the method described herein using motion behavior to initiate an adjustment of the rate of location monitoring and reporting can be performed in a GPS system without assisted data.

As seen in FIG. 7, the system 100 comprises a service center 16, a ground base station 18, a beacon 32, and a smart tag 14 adapted to releasably affix to a person or object of interest 12. The ground base station 18 is connected to the service center 16 via IP network 30. The service center 16 further comprises a central processing server 24, a customer application server 26 connected to the central processing server 24 via a application programming interface 25, and stationary GPS receiver 22 furnished with an antenna 20. The receiver 22 and the smart tag 14 are adapted for to receive signals broadcasted by satellites 10a . . . 10d via wireless communication channels 40 and 42, respectively. The ground base station 18 is adapted to wirelessly RF-communicate with the smart tag 14 via a channel 44. The stationary GPS receiver 22 furnished with the antenna 20 is adapted to search for and receive signals broadcasted by the satellites available for receiving. As seen in FIG. 7, the beacon device 32 has a service zone 34.

In some embodiments, the smart tag 14 affixed to a person or object of interest 12 is situated in the service zone 34 of the beacon device 32. The smart tag 14 is woken up by either itself when sensing predefined conditions or events (such as motion or time elapsed) or a command sent from the service center 16. Being woken up, for example, by the service center 16, the smart tag 14 receives a signal from the beacon device 32 via wireless communication channel 46. The aforesaid signal carries ID data of this specific beacon 32. The smart tag 14 measures parameters of the beacon signal and derives the beacon ID data. Further the beacon 32 retransmits the received beacon ID and signal measurement data to the service center 16. The beacon ID data enables the service center 16 to determine an approximate location of the smart tag 14 and provide the smart tag 14 with assisted data. This data is generated according to satellite-broadcasted signals receivable by the stationary reference GPS receiver 22.

As discussed above, providing the smart tag 14 with assisted data enables the system 100 to reduce energy consumption due to shortening TTFF (acquisition assistance) and more reliable reception (sensitivity assistance) for use in indoor conditions.

The smart tag 14 performs signal search according to the received assisted data, receives satellite-broadcasted signals and calculates pseudo-ranges from the tag 14 to the available satellites 10a, 10b, 10c, and 10d. The calculated pseudo-ranges are transmitted to the service center 16 for further processing. The central processing server 24 is adapted to calculate a location of the smart tag 14 by means of triangulating the obtained pseudo-ranges.

Reduced power consumption comes about because the smart tag 14 is in standby condition and is woken up for a short time on demand.

Figure 8:
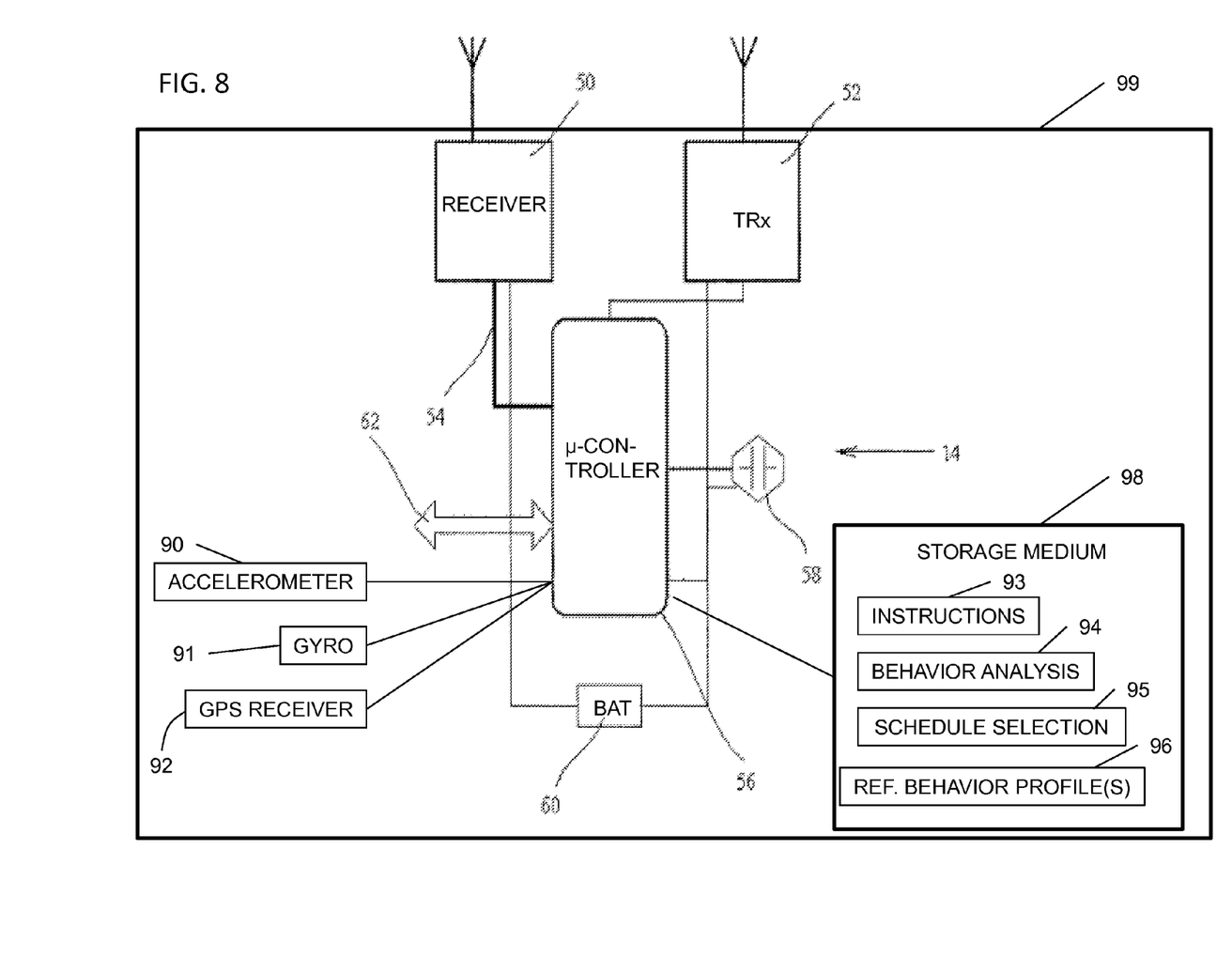
FIG. 8 is a schematic diagram of the tag as shown in FIG. 7.

Reference is now is made to FIG. 8, presenting a block diagram of the smart tag 14. The smart tag has a housing 99 adapted to be affixed to a person or object. The smart tag 14 may comprise a standard GPS receiver (or an AGPS receiver) 50, an RF-transceiver 52, a data bus 54, a microcontroller unit 56, a motion sensor 58, a battery 60, and I/O port 62. In some embodiments, the motion sensor 58 is an accelerometer. In other embodiments, the motion sensor 58 is a gyro, and a separate sensor 90 is provided. The sensor 58 or 90 in the housing 99 is capable of detecting motion and generating a first signal characterizing the motion;

A second sensor is capable of collecting location data. In some embodiments, the second sensor is a gyro 91. In other embodiments, the second sensor is a GPS receiver 92. In other embodiments, the second sensor is an RF transceiver in communication with RF beacons 32.

The tag 14 has at least one non-transitory storage medium 98, such as a flash memory, containing general operating computer program instructions 93, behavior analysis instructions 94, schedule selection instructions 95, and reference behavior profiles/templates 96.

The processor 56 (which can be a microcontroller) in the housing 99, is configured for receiving a first signal from the first (motion) sensor and analyzing the signal to determine whether a condition is present. The condition is one of the group consisting of the person or object performing a first predetermined motion and the person or object not performing a second predetermined motion, the processor capable of controlling the second sensor to collect location data according to a schedule selected by the processor based on a result of the analyzing. A transmitter is provided for transmitting a signal representing the location from the device to an external device separate from the device according to the schedule while the condition is present. In some embodiment, the transceiver 52 provides the transmitter for transmitting the location data.

As discussed above, the smart tag 14 can be in standby condition by default. The tag is woken up by either itself when sensing predefined events (such as motion or time elapsed) or a command sent from the service center 16 via the wireless RF-communication channel 44. The transceiver 52 receives a signal from the beacon device 32 via wireless communication channel 46. The aforesaid signal carries ID data of the specific beacon 32. The microcontroller 56 measures signal parameters and derives the beacon ID data. Optionally, a received signal strength indicator and a phase delay or any combination thereof are measured by microcontroller 56.

Further, the transceiver 52 retransmits the received beacon ID and signal measurement data to the service center 16. The beacon ID data enables the service center 16 (not shown) to determine an approximate location of the smart tag 14, generate the assisted data, and provide the smart tag 14 with the approximate location and the assisted data.

Being provided with assisted data, the AGPS receiver 50 searches and receives the satellite-broadcasted signals. The pseudo-random waveform received by GPS receiver 50 is compared with an internally generated version of the same code with delay control, until both waveforms are synchronized. The obtained delay of internal pseudo-random form corresponding to the waveform synchronization defines the travel time of the GPS signal from the satellite to the receiver 50. The obtained delay values are provided via the data bus 54 to the microcontroller unit 56. The delay values (pseudo-ranges) further are transferred to the service center 16 via an RF-communication link 44 for calculating the smart tag location. Thereafter, the smart tag 14 restores to the standby condition.

The smart tag 14 is a mobile battery-powered device. Therefore, the methods described herein secure a long battery service life. The smart tag 14 further comprises a motion sensor 58 enabling the service center to assist tracking the smart tag 14 outside the service area. I/O port 62 provides a connection of peripheral devices (not shown) to the smart tag 14 and two-way data interchange between the aforesaid device and the service center 16.

Figure 9:
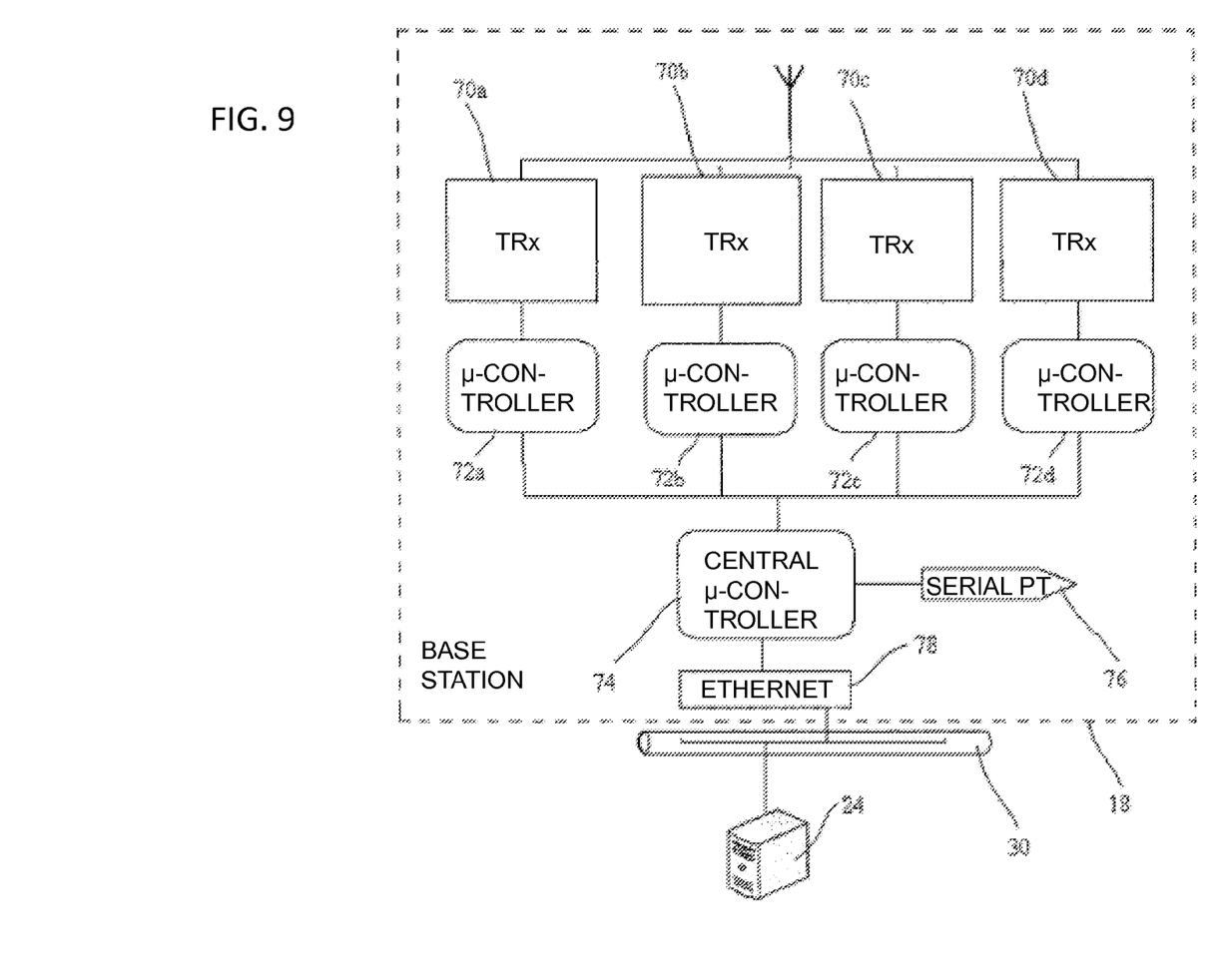
FIG. 9 is a schematic diagram of the base station shown in FIG. 7.

Reference is now made to FIG. 9, schematically illustrating a block diagram of the architecture of the ground base station 18. The aforesaid base station 18 is a ground communication unit communicating with the plurality of mobile smart tags via wireless communication links.

The base station 18 comprises four independent RF transceiver modules 70a, 70b, 70e, and 70d (rack transceiver) operating simultaneously. The rack transceiver is required for supporting the frequency diversity mode of operation, providing the required capabilities for withstanding external interferences. Microcontroller units 72a, 72b, 72c, and 72d perform management of the data stream in transceivers 70a, 70b, 70e, and 70d, respectively.

A central microcontroller unit 74 is responsible for activating and controlling internal operational logic of the base station 18. A serial port 76 connects peripheral devices to the base station 18. As seen in FIG. 9, the base station 18 further comprises Ethernet chipset 78 for connecting to the Ethernet 30. The base station 18 is controlled by central processing server 24 via the Ethernet connection 30.

Figure 10:
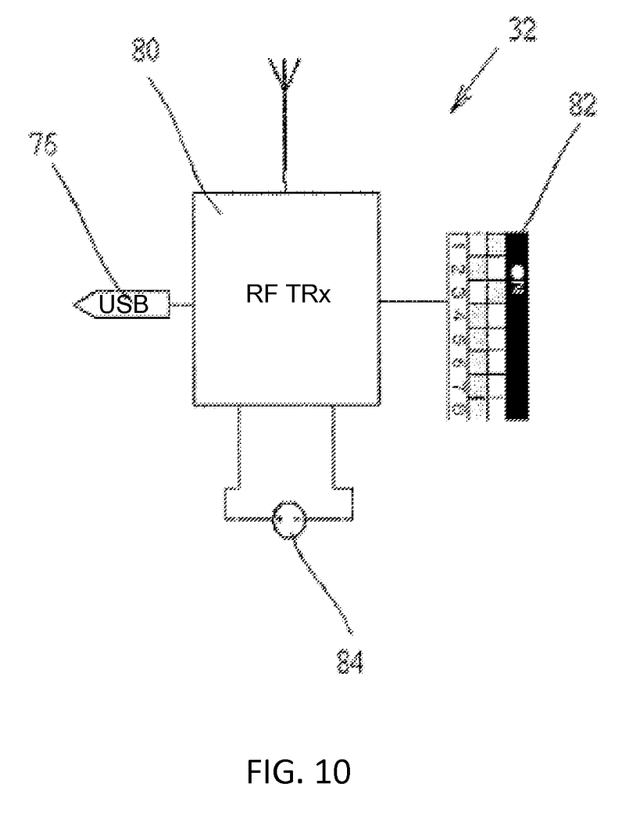
FIG. 10 is a schematic diagram of the beacon shown in FIG. 7.

Reference is now made to FIG. 10, presenting a block diagram of the AC/DC (84)-powered beacon device 32 comprising an RF-transceiver 80 capable of transmitting beacon device ID data at the predetermined frequency and time. The beacon device 32 is furnished with an attenuator 82 and the serial or USB port 76 enabling the service center to change over the air a level of emitted power and configuring and maintaining the beacon device 32, respectively.

In the examples discussed above, the reference behaviors include motion (or lack of motion). In other embodiments, the reference behavior is entering a distinctive ambient, and the tag has a sensor for sensing the ambient condition, such as ambient temperature, barometric pressure, humidity, or a sensor capable of detecting any particular gas (e.g., natural gas or carbon monoxide). Such a tag may be useful if it is desirable to frequently monitor activity at a location that has a distinctive ambient. For example, if it is desirable to monitor any activity in a desert, an ambient temperature or humidity sensor can transmit signals that are analyzed by a processor within the tag; the processor can then increase the location monitoring and reporting rate by the tag if the subject enters an extremely hot or extremely dry ambient. (The rate can be proportional to the temperature increase beyond normal work environment temperature, or proportional to the humidity decrease below normal work environment humidity) When the sensor detects that the ambient temperature and humidity have returned to normal, the processor reduces the location monitoring and reporting rate by the tag to the normal rate.

In other embodiments, the first device senses a body parameter, such as temperature, heart rate, blood pressure, blood alcohol content or the like which is indicative of behavior. Such parameters involve correspondingly different types of sensors, which can be invasive or non-invasive, depending on the parameter to be monitored. For example, an employee who performs a task involving public safety may be required to periodically breathe into a breathalyzer. The processor in the tag can adjust the location monitoring and reporting rate to an increased rate in proportion to the blood alcohol content; or increase the monitoring and reporting rate to an increased rate in proportion to a length of time in which the employee has not breathed into the breathalyzer (based on the assumption that an employee who has been drinking is likely to avoid breathing into the breathalyzer). The processor in the tag can return the location monitoring and reporting rate to normal when the employee resumes regular use of the breathalyzer with zero or low blood alcohol content. In another example, an employee who handles delicate objects may be prohibited from running while at work. A sensor can sense the employee's heart rate, which is likely to be significantly elevated if the employee has been running. The processor in the tag can adjust the rate of monitoring and reporting location based on the detected heart rate.

Thus, the first device can be any of a wide variety of sensors which detect a condition that correlated with the subject's behavior or location. The processor in the tag can analyze the signals from the sensor and correlate the frequency of location monitoring and reporting to the behavior. This permits the tag to lower power consumption when the reference behavior is not being performed and increase the battery life, without compromising the location log during times when the reference behavior is being performed.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A method comprising:
receiving a signal from a first device that is part of a tag, the tag adapted to be affixed to a person or object, the receiving being performed by a processor within the tag;
analyzing the signal within the processor to determine whether the person or object is performing a predetermined type of behavior, the analyzing including computing a measure of how closely the received signal resembles a signal corresponding to the person or object performing the predetermined type of behavior;
adjusting a variable rate of transmitting a monitoring signal from the tag, based on a result of the analyzing, wherein the variable rate is adjusted as a monotonically increasing function of the computed measure, the adjusting being controlled by the processor; and
transmitting the monitoring signal from the tag to an external device separate from the tag at the adjusted variable rate.

2. The method of claim 1, wherein:
the predetermined type of behavior is a predetermined type of motion;
the first device is capable of transmitting respectively different signal patterns corresponding to respectively different types of motion, and
the processor is programmed to recognize at least one predetermined signal pattern as representing a performance of the predetermined type of motion by the person or object.

3. The method of claim 1, wherein the monitoring signal is the signal received from the first device.

4. The method of claim 1, wherein the monitoring signal is a signal received from a second device, and wherein transmitting signals from the second device uses more power than transmitting signals from the first device.

5. The method of claim 4, wherein the first device is an accelerometer and the second device is one is a global positioning system (GPS) receiver, a gyro or a transceiver configured to communicate with a plurality of radio frequency beacons.

6. The method of claim 4, wherein the first device measures acceleration, and the second device senses position.

7. The method of claim 1, wherein the predetermined behavior is one of the group consisting of walking, running, jumping, falling and driving.

8. The method of claim 1, further comprising:
before the receiving step, sampling the signal output by the first device in a learning mode while a person or object performs the predetermined behavior before the receiving step, wherein the analyzing step includes comparing the sampled signal to the received signal.

9. A method comprising:
receiving a signal from a first device that is part of a tag, the tag adapted to be affixed to a person or object, wherein the first device is capable of transmitting respectively different signal patterns corresponding to respectively different types of motion, the receiving being performed by a processor within the tag;
analyzing the signal within the processor to determine whether the person or object is performing a predetermined type of motion, where the processor is programmed to recognize at least one predetermined signal pattern as representing a performance of the predetermined type of motion by the person or object;
adjusting a variable rate of transmitting a monitoring signal from the tag, based on a result of the analyzing, the adjusting being controlled by a processor, wherein the adjusting includes increasing the variable rate when the at least one predetermined signal pattern is recognized; and
transmitting the monitoring signal from the tag to an external device separate from the tag at the adjusted variable rate.

10. The method of claim 9, wherein the analyzing includes computing a measure of how closely the received signal resembles a signal corresponding to the person or object performing the predetermined behavior and determining the variable rate as a monotonically increasing function of the computed measure.

11. A method comprising:
storing a representation of at least one predetermined motion pattern in a storage device within a tag;
receiving a signal from a first device that is part of the tag, the tag adapted to be affixed to a person or object, the receiving being performed by a processor within the tag, wherein the storing is performed before the receiving step,
analyzing the signal within the processor to determine whether the person or object is performing a predetermined type of behavior, wherein the analyzing step includes comparing the stored signal to the received signal;
adjusting a variable rate of transmitting a monitoring signal from the tag, based on a result of the analyzing, the adjusting being controlled by the processor; and
transmitting the monitoring signal from the tag to an external device separate from the tag at the adjusted variable rate.

12. A method comprising:
receiving a signal from a first device within a tag adapted to be affixed to a person or object, the receiving being performed by a processor within the tag;
analyzing the received signal over a period of time within the processor to determine whether a behavior of the person or object is changing substantially over the period of time;
adjusting a variable rate of transmitting a monitoring signal from the tag, based on the analyzing, the adjusting being controlled by the processor, wherein the variable rate is adjusted by an amount that increases monotonically as a function of a magnitude of the changing; and
transmitting the monitoring signal from the tag to an external device separate from the tag at the adjusted variable rate.

13. A method comprising:
selecting a condition based on a job position of a person, the condition being from the group consisting of the person performing a first predetermined behavior and the person not performing a second predetermined behavior;
after the selecting, receiving a signal from a first device within a tag adapted to be affixed to the person, the receiving being performed by a processor within or on the tag;
analyzing the signal within the processor to determine whether the condition is present;
monitoring a location of the tag if the condition is determined to be present; and
transmitting a signal representing the location from the tag to an external device separate from the tag while the condition is present.

14. The method of claim 13, wherein:
the condition comprises the person being in a moving helicopter.

15. The method of claim 13, wherein the condition is the person performing a predetermined one of the group consisting of walking, running, jumping, falling and driving.

16. A device comprising:
a housing adapted to be affixed to a person or object;
a first sensor in the housing capable of generating a signal indicative of a behavior of the person or object, the first sensor is capable of transmitting respectively different signal patterns corresponding to respectively different types of motion;
a second sensor capable of collecting location data;
a processor in the housing, the processor configured for receiving the first signal from the first sensor and analyzing the signal to determine whether the person or object is performing a predetermined motion, the processor capable of controlling the second sensor to collect location data according to a schedule selected by the processor based on a result of the analyzing, the processor programmed to recognize at least one predetermined signal pattern as representing a performance of the predetermined motion by the person or object, the processor programmed to adjust a variable rate of transmitting a monitoring signal from the tag, based on a result of the analyzing, wherein the adjusting includes increasing the variable rate when at least one predetermined signal pattern is recognized; and
a transmitter for transmitting a signal representing the location from the device to an external device separate from the device according to the schedule while the condition is present.

* * * * *